Patented Oct. 6, 1925.

1,556,120

UNITED STATES PATENT OFFICE.

CLARENCE A. MILLS, OF CINCINNATI, OHIO.

METHOD OF STERILIZING PROTEINS OR OTHER COLLOIDAL MATERIAL.

No Drawing.   Application filed July 25, 1922.   Serial No. 577,442.

*To all whom it may concern:*

Be it known that I, CLARENCE A. MILLS, a citizen of the United States, and a resident of Cincinnati, in the county of Hamilton and State of Ohio, have invented certain new and useful Methods of Sterilizing Proteins or Other Colloidal Material, of which the following is a full, clear, and exact description.

My invention relates to methods of sterilizing colloidal material, particularly delicate organic proteins, including enzymes, globulins, serums, antitoxins and the like having usefulness as medicinal preparations.

So far as I am advised, it has not been considered possible in the past to sterilize such delicate materials as the special proteins and organic colloids above mentioned, and hence all that has been done is to take precaution that the animals from which the colloids were obtained were free from communicable disease. There is always, in the present practice of medicine, the chance of bacteria being present in serums, blood coagulents, and like materials used by injections, or for internal use.

I have discovered that if a serum, coagulent or other protein having an active nature is rendered inactive by combining it with a heavy metal such as mercury, that the removal of the mercury from the combination permits the protein to become active again i. e. to regain their medicinal attributes. During the inactive stage, sufficient mercury, as in the form of a bichloride, can be used and sufficient length of time given it for action, to definitely kill all organized living things such as bacteria.

It has been known that when a proteinate or other organic colloidal material salt of mercury is treated with a light metallic salt, that the mercury will leave the combinations with the colloid and form a soluble double salt, resulting in the solution becoming clear when sufficiently salty to bring the protein into solution. It has also been known that any solution containing a protein therein and also a metallic salt therein, can be cleared of the salt by the process known as dialyzing.

This is accomplished by placing a parchment paper receptacle containing the complex solution into running water or other water having a substance therein which will amalgamate the metal, that the metal salt will pass through the parchment and the colloidal mass will not, so that after a given length of time all of the metal salt can be entirely removed.

I employ the solution clearing method and mercury bichloride and the dialyzing method in my sterilization process, the crux of which is that I have discovered, as above stated, that the active ingredients or medicinal properties of the protein or colloidal substance are not destroyed by its association during a sterilizing period with the mercury.

I do not in describing in detail a sample process, desire to intimate that other salts could not be used, but I wish to point out that a method of removing the mercury by means of a gas which will convert the mercury into an insoluble material does not seem practical. The reason for not converting the mercury into an insoluble salt is because the action of the colloid in the solution will be to preserve a certain portion of the insoluble salt in suspension, thereby rendering the colloid undesirable for medical or therapeutic use.

It will be possible, however, to reverse the amalgamating and dialyzing steps, as will be pointed out below.

Describing then a complete method of sterilization of a colloid, such as, for example, the active globulin in blood coagulent, the active material is placed into solution in a salt water, preferably around .9% normal. Sodium chloride may be well used for this purpose. Bichloride of mercury is then added to a sufficient extent to sterilize the protein. This amount is well known, but I follow the practice of making the solution .5% $HgCl_2$.

The action will then be to form a dense white precipitate and sufficient time is allowed to elapse for full sterilization. This is also well known to those skilled in the art.

After sterilization has taken place, sufficient additional salt, such as sodium chloride, ammonium chloride, or like light metal salts, are added, which will result, as has been demonstrated, in the mercury going into the form of a soluble double salt with the light metal, and also the protein will go back into solution. Agitation is not desirable at any time, as this might destroy the protein.

Having obtained a clear solution again, two things may be done.

(1) The material may be placed in a dialyzing bag and (2) it may be immersed in running water and immersed in a bath containing a desirable amount of metallic copper pieces. In either case the mercury salt will be removed, in the first instance flowing away with the running water, and in the second, the mercury amalgamating with the copper.

removal of the mercury from the protein. By proteins and the like in the claims that follow I wish to include the full range of colloids having useful medicinal properties.

Having thus described my invention, what I claim as new and desire to secure by Letters Patent, is:—

1. A process for sterilizing sensitive medicinal and therapeutic proteins and the like, which consists in treating a solution containing such protein with mercury bichloride, subsequently clearing the solution by converting the mercury proteinate into